(12) United States Patent
Ohmura et al.

(10) Patent No.: US 6,435,603 B1
(45) Date of Patent: Aug. 20, 2002

(54) STRUCTURE FOR FRONT PART OF AUTOMOTIVE VEHICLE BODY

(75) Inventors: Shigeru Ohmura; Kengo Ishibashi, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/572,783

(22) Filed: May 17, 2000

(30) Foreign Application Priority Data

May 18, 1999 (JP) .......................................... 11-136594

(51) Int. Cl.⁷ .................................................. B60J 9/00
(52) U.S. Cl. ...................... 296/194; 296/204; 296/188; 296/189; 296/203.02
(58) Field of Search ............................... 296/194, 204, 296/186, 188, 189, 203.02

(56) References Cited

U.S. PATENT DOCUMENTS

| | | | |
|---|---|---|---|
| 5,011,201 A | | 4/1991 | Takahashi et al. .......... 296/203 |
| 5,125,715 A | * | 6/1992 | Kijima ........................ 296/189 |
| 5,713,625 A | | 2/1998 | Takahashi et al. .......... 296/194 |
| 5,771,773 A | * | 6/1998 | Sakamoto et al. .......... 91/369.2 |
| 5,882,065 A | * | 3/1999 | Koiwa et al. .......... 296/203.02 |
| 6,095,592 A | * | 8/2000 | Nakatani ..................... 296/188 |

FOREIGN PATENT DOCUMENTS

JP    10 138953    5/1998

* cited by examiner

Primary Examiner—Stephen T. Gordon
Assistant Examiner—Lori L Coletta
(74) Attorney, Agent, or Firm—Armstrong, Westerman & Hattori, LLP

(57) ABSTRACT

A structure for a front part of an automotive vehicle body having front side frames 2 extending longitudinal directions above a front axle 1, intermediate frames 5 connecting rear ends of the side frames 2 to front ends of floor frames 4 extending longitudinal directions underneath a floor of a passenger compartment and a dash panel 7 separating an engine compartment 6 from the passenger compartment, wherein the dash panel extends upwardly from longitudinally intermediate portions of the intermediate frames. With this construction, since the connecting points between the front side frames and the intermediate frames, i.e., the part that is to be bent by virtue of a crash load, are located forward of he dash panel, the effect on the deformation of the passenger compartment by the deformation of the frames can be alleviated.

1 Claim, 2 Drawing Sheets

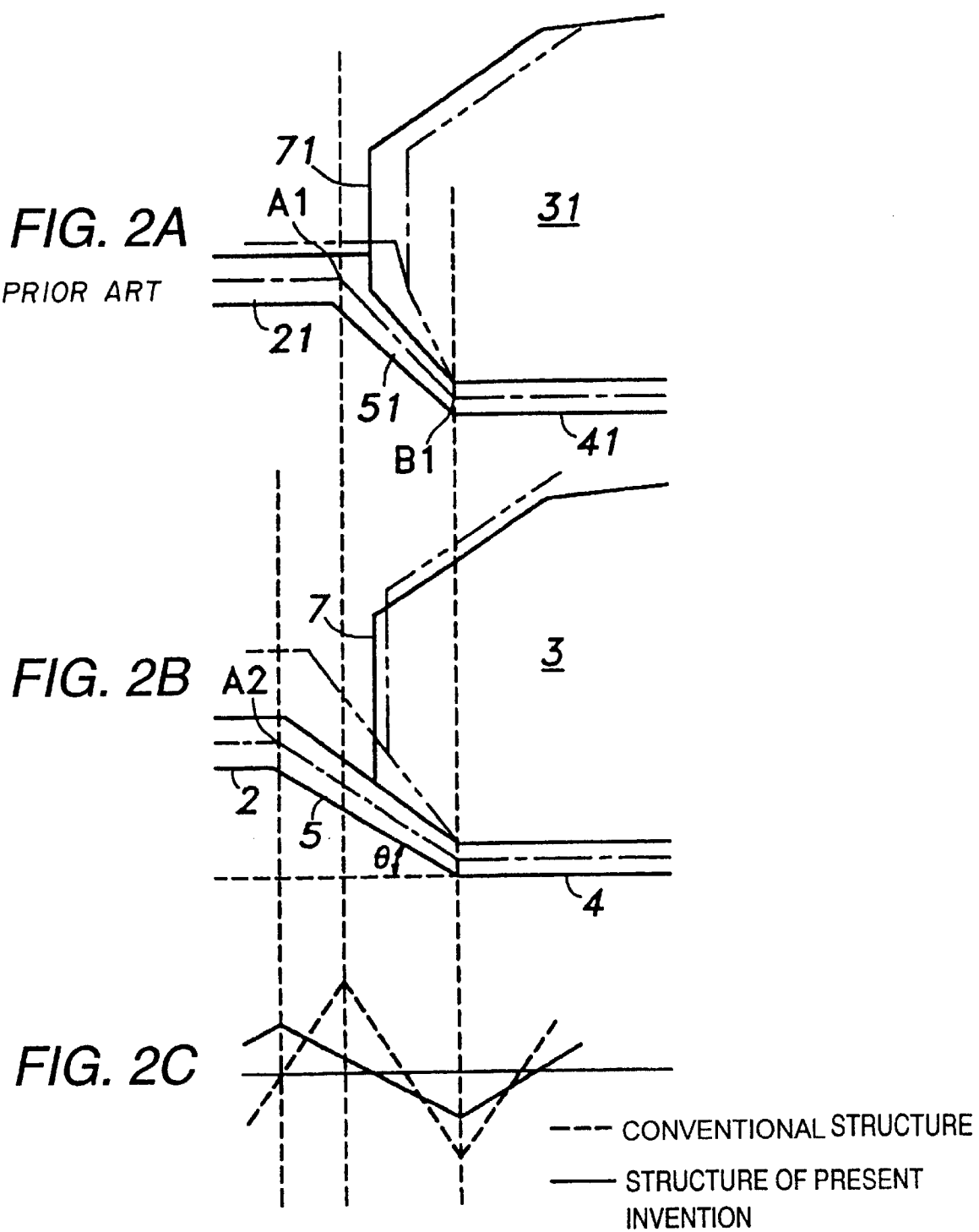

US 6,435,603 B1

STRUCTURE FOR FRONT PART OF AUTOMOTIVE VEHICLE BODY

BACKGROUND OF THE INVENTION

The present invention relates to a structure for a front part of an automotive vehicle body.

A front part of an automotive vehicle body comprises front side frames extending longitudinal directions above a front axle, intermediate frames connecting rear ends of the front side frames to front ends of floor frames extending longitudinal directions underneath a floor of a passenger compartment and a dash panel separating an engine compartment from the passenger compartment. Conventionally, it is common that the dash panel rises from connecting portions between the front side frames and the intermediate frames (refer to Japanese Patent Unexamined Publication No. Hei. 10-138953).

However, a bending moment applied to the frames of a vehicle when a crash load is inputted from the front becomes maximum at respective connecting portions between the intermediate frames to the front side and floor frames, respectively. Therefore, when the vehicle comes into a frontal collision, the connecting portions between the rear ends of the front side frames and the front ends of the intermediate frames are bent, and in particular, with a structure being adopted in which the rear ends of the front side frames abut against a vertical plane of the dash panel, it is inevitable that the deformation so made affects as far as the passenger compartment.

Since the excessive deformation of the passenger compartment is not preferable from an occupant protection point of view, conventionally, the frames are reinforced such that the connecting portions between the frames and the dash panel are difficult to be deformed.

However, there is caused a problem that the aforesaid way of reinforcement increases the vehicle weight.

SUMMARY OF THE INVENTION

The present invention was made with a view to solving the problem which is inherently found with the conventional technique.

It is an object of the invention to provide a structure for a front part of an automotive vehicle body which can realize the compatibility of the reduction in the vehicle weight and the protection of the passenger compartment at a higher level.

The above-mentioned object can be attained by a structure for a front part of an automotive vehicle body, according to the invention, having front side frames 2 extending longitudinal directions above a front axle 1, intermediate frames 5 connecting rear ends of the side frames 2 and front ends of floor frames 4 in a longitudinal direction underneath a floor of a passenger compartment and a dash panel 7 separating an engine compartment 6 from the passenger compartment 3, wherein the dash panel extends upwardly from longitudinally intermediate portions of said intermediate frames.

With this construction, since the connecting points between the front side frames and the intermediate frames, that is, the portions which are bent by virtue of a crash load are located forward of the dash panel, the effect on the passenger compartment by the deformed frames is alleviated.

BRIEF DESCRIPTION OF THE DRAWINGS

FIGS. 2A–2C shows an explanatory comparative view for comparing the structure according to the invention with, a conventional one.

DETAILED DESCRIPTION OF THE PREFERRED EMBODIMENT

Figure 1:
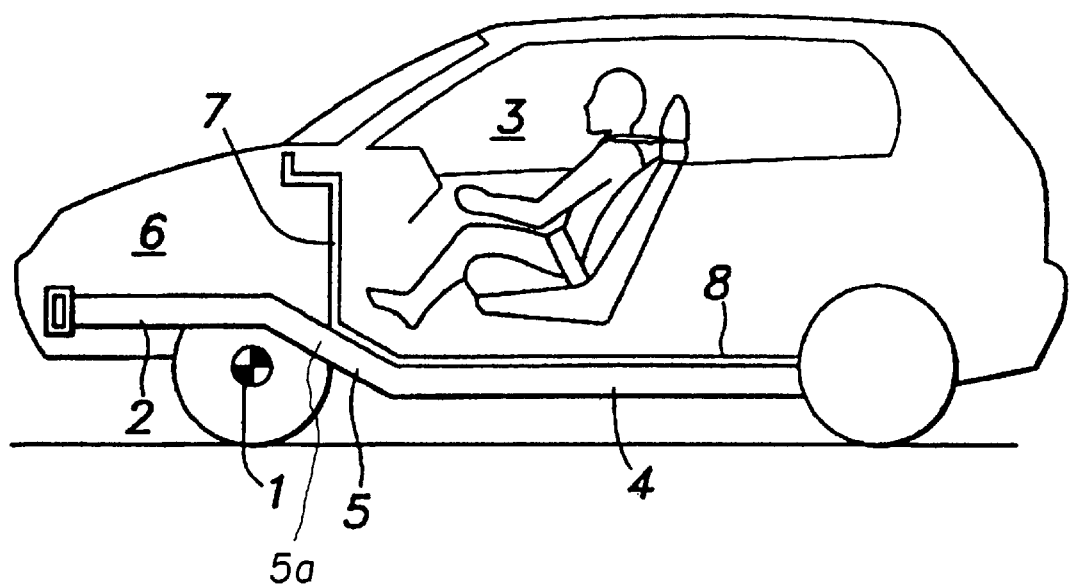
FIG. 1 shows a schematic view of a structure for an automotive vehicle body according to the invention.

Referring to an embodiment shown in the accompanying drawings, the invention will be described in detail below.

FIG. 1 shows schematically a structure for a front part of an automotive vehicle to which the invention is applied. The illustrated structure for the front part of the automotive vehicle body comprises front side frames 2 extending longitudinally above a front axle 1, inclined forwardly upwardly intermediate frames 5 connecting rear ends of the front side frames 2 to front ends of floor frames 4 extending longitudinally underneath a floor of a passenger compartment 3, and a dash panel 7 separating the passenger compartment 3 from an engine compartment 6.

The dash panel 7 extends upwardly from intermediate portions 5a which are located between the respective connecting portions of the front side frames 2 and floor frames 4. A lower edge of the dash panel 7 is connected to a floor panel 8 provided so as to extend from rear upper surfaces of the intermediate frames 5 to upper surfaces of the floor frames 4.

Then, according to a conventional structure (FIG. 2A) in which rear ends of front side frames 21 abut against a vertical plane of a dash panel 71, connecting points A1 between the front side frames 21 and intermediate frames 51 are located at positions in the vicinity of the dash panel 71. In this construction, when a bending moment is applied to the front side frames 21 and the intermediate frames 51 by virtue of a load generated in the longitudinal direction of the vehicle body when the vehicle comes into a frontal collision, a bending moment diagram around a Y axis becomes as shown by a broken line in FIG. 2C, whereby great peaks are generated at the respective connecting points A1, B1 between the intermediate frames 51 and the front side frames 21 and the floor frames 41. Due to this, when the connecting points A1, B1 between the front side frames 21 and the intermediate frames 51 are bent by virtue of a crash load, a deformation so generated results in a great rearward recession of the dash panel 71, in other words, the deformation of the passenger compartment 31.

According to the invention, however, since the connecting points A2 between the front side frames 2 and the intermediate frames 5 are located forward of the vertical plane of the dash panel 7 (FIG. 2B), the receding amount of the dash panel 7 by virtue of bends generated at the connecting points A2 between the front side frames 2 and the intermediate frames 5 is reduced.

Thus, since the inclined angle Θ of the intermediate frame 5 relative to the horizontal plane can be reduced by locating the connecting point A2 between the front side frame 2 and the intermediate frame 5 forward further than the conventional structure, as shown by a solid line in FIG. 2C, the peak of the bending moment can also be reduced. This, of course, contributes largely to reducing further the deformation amount of the passenger compartment 3.

Thus, since the deformation of the passenger compartment due to the deformation of the part extending from the front side frames to the floor frames by not making the rear ends of the front side frames abut against the vertical plane of the dash panel and making smooth and easy the angle transitions at the curved portions where the front side frames and floor frames reach the intermediate frames, respectively, the construction according to the invention can largely contribute to the realization of the compatibility of the reduction in vehicle weight and the protection of the passenger compartment at an enhanced level.

While there has been described in connection with the referred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A structure for a front part of an automotive vehicle body comprising:

a front side frame extending in a longitudinal direction above a front axle;

an intermediate frame connecting a rear end of said front side frame to a front end of a floor frame, said floor frame extending in a longitudinal direction underneath a floor of a passenger compartment, said intermediate frame having an intermediate portion located between a front end and a rear end thereof; and a dash panel separating an engine compartment from said passenger compartment, wherein a vertical plane of said dash panel extends upwardly from the upper surface of the longitudinally intermediate portion of said intermediate frame, wherein said intermediate portion is located between a connecting portion defined between the front side frame and the intermediate frame and connecting portion defined between said intermediate frame and said floor frame, said intermediate frame is forwardly and upwardly inclined, said dash panel is connected to a floor panel which extends from a rear upper surface of the intermediate frame to an upper surface of the floor frame, and said connecting portion defined between the front side frame and said intermediate frame is disposed forward of said vertical plane of said dash panel.

* * * * *